UNITED STATES PATENT OFFICE.

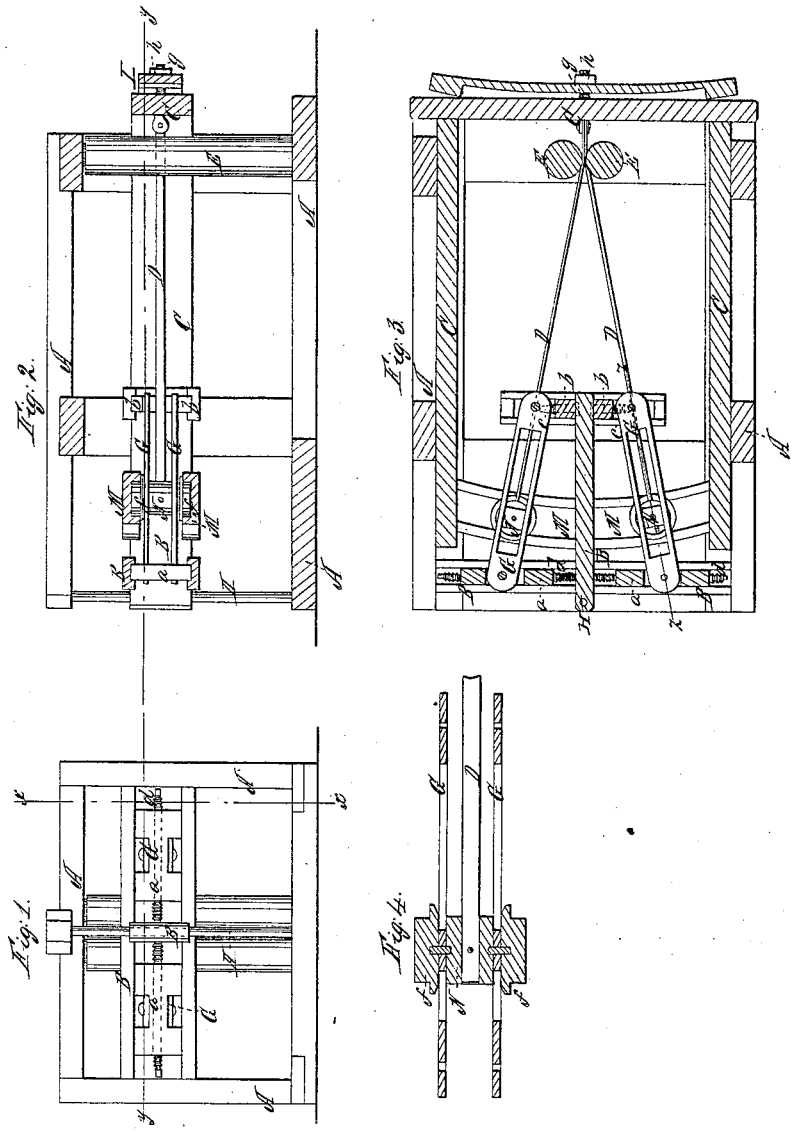

C. G. BEITEL AND HENRY J. BRUNNER, OF NAZARETH, PENNSYLVANIA.

MACHINE FOR SAWING STONE.

Specification of Letters Patent No. 13,591, dated September 25, 1855.

*To all whom it may concern:*

Be it known that we, C. G. BEITEL and H. J. BRUNNER, of Nazareth, in the county of Northampton and State of Pennsylvania, have invented a new and Improved Machine for Sawing Stone into Tapering Blocks or Slabs; and we do hereby declare that the following is a full and exact description thereof, reference being had to the accompanying drawings, making part of this specification, Figure 1 being an end elevation of the machine; Fig. 2, a longitudinal vertical section thereof in the plane $x\ x$, Fig. 1; Fig. 3, a horizontal section in the plane $y\ y$, Figs. 1 and 2; Fig. 4, section in the line $z\ z$, Fig. 1.

Like letters designate corresponding parts in all the figures.

The frame A, is constructed in any suitable manner, for the reception of the devices which constitute our invention. In the center, at one end, is a vertical guiding rod H, on which slides, up and down, a guide-frame B. In the center of the other end of the frame A, are situated two vertical rollers E, E, with just enough space between them to admit the thickness of two saws. The guide-frame B, is provided with two sets of transverse grooves, in which are respectively situated head-blocks $a$, $a$, and $b$, $b$. From the blocks $a$, $a$, to $b$, $b$, extend two pairs of slotted ways G, G, being hinged to said head-blocks, by pivots, substantially as represented. The head-blocks are made adjustable in the grooves, by means of screws $c$, $c$, and $d$, $d$, or other convenient means, so that they may incline the ways G, G, to any desired angle, as far as the machine may be capable of allowing. In adjusting these blocks, care must be taken to point the ways accurately to the narrow space between the rollers E, E.

The saw-gate C, is provided with a spring I, situated on the outside of the cross-head of the frame next to the rollers E, E; and the two saws D, D, are secured, at this end, in the same stirrup, the shank of which passes through both the cross-head and spring, and terminates in a screw thread $g$, on which a nut $h$, is screwed, both to secure the saws and to regulate their tension. The two saws pass together between the rollers E, E, and then diverge, their other ends being secured to guide-blocks N, N, which slide respectively in the ways G, G, and also in curved grooves, M, M, formed in the cross-head of the saw gate. Friction rollers $f$, $f$, are placed upon the ends of the guide-blocks, to enable them to move freely in the grooves M, M.

Motion is given to the saw-gate, by means of ropes at the four corners, or any other convenient device. As the saw-gate moves forward, the rollers E, E, keep the saws in contact as far as they move, the springs I allowing them to approach, and also straightening the saws again, as they recede from the rollers; and as the centers of the ways G, G, are both in lines which meet precisely at the first point of contact of the saws between the rollers, it follows that the saws move and cut in stationary, converging lines, and will consequently cut the stone almost to a point. The ends of the saws which are inserted in the guide blocks N, N, are constantly approaching and receding toward and from each other; but the grooves M, M; forming the arcs of a circle whose center is at the point of contact between the rollers E, E, the saws will retain a constant degree of tension. The degree of taper is varied by simply adjusting the head-blocks of the ways G, G, to the desired angle, as before described. The guide-frame B, and saw-gate C, sink together, as the saws cut into the stone, the cut being regulated in the usual manner.

We do not claim flexible saws, radial and curved ways, or guiding rollers, separately; but

What we claim as our invention and desire to secure by Letters Patent, is—

The combination of the flexible saws D, D, rollers E, E, adjustable radial ways G, G, and concentric grooves, or ways, M, M; whereby the saws are enabled to run at different angles and their open ends to approach and separate without affecting the degree of their tension, substantially as described.

In witness whereof we have hereunto set our hands this twenty-ninth day of August 1855.

C. G. BEITEL.
HENRY J. BRUNNER.

Witnesses:
WM. T. KERN,
CHRISTIAN D. BUSSE.